(12) United States Patent
Wieres et al.

(10) Patent No.: US 8,296,946 B2
(45) Date of Patent: Oct. 30, 2012

(54) METHOD FOR GENERATING OPENINGS IN A METAL FOIL

(75) Inventors: Ludwig Wieres, Overath (DE); Jan Hodgson, Troisdorf (DE); Ferdi Kurth, Mechernich (DE); Michael Voit, Leverkusen (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 306 days.

(21) Appl. No.: 12/353,650

(22) Filed: Jan. 14, 2009

(65) Prior Publication Data
US 2009/0158741 A1    Jun. 25, 2009

Related U.S. Application Data

(63) Continuation of application No. PCT/EP2007/006224, filed on Jul. 13, 2007.

(30) Foreign Application Priority Data

Jul. 14, 2006 (GB) .................. 10 2006 032 861

(51) Int. Cl.
*B21D 51/16* (2006.01)
(52) U.S. Cl. ........ 29/890; 29/890.039; 29/17.2; 55/520; 422/180
(58) Field of Classification Search .............. 29/890, 29/890.039, 17.1, 17.2, 17.4; 422/180; 55/520–529; 72/196
See application file for complete search history.

(56) References Cited

U.S. PATENT DOCUMENTS

| | | | |
|---|---|---|---|
| 3,986,301 A * | 10/1976 | Lough et al. | 451/261 |
| 5,085,268 A | 2/1992 | Nilsson | |
| 6,354,368 B1 * | 3/2002 | Nishishita et al. | 165/135 |
| 6,387,200 B1 * | 5/2002 | Ashmead et al. | 156/79 |
| 7,138,358 B2 * | 11/2006 | Huang et al. | 502/326 |
| 2005/0274012 A1 | 12/2005 | Hodgson et al. | |
| 2007/0234714 A1 | 10/2007 | Maus et al. | |

FOREIGN PATENT DOCUMENTS

| | | |
|---|---|---|
| CN | 1748075 A | 3/2006 |
| GB | 1019359 | 2/1966 |
| JP | 8131848 A | 5/1996 |
| JP | 2005299520 A | 10/2005 |
| WO | 2006050971 A1 | 5/2006 |

OTHER PUBLICATIONS

International Search Report, dated Oct. 23, 2007.
English translation of Chinese Office Action dated Feb. 5, 2010.

* cited by examiner

*Primary Examiner* — Sarang Afzali
(74) *Attorney, Agent, or Firm* — Laurence A. Greenberg; Werner H. Stemer; Ralph E. Locher

(57) ABSTRACT

A method for generating openings in a metal foil includes at least the following steps: a) providing a planar metal foil, b) generating bends defining extrema in the metal foil, and c) generating at least one opening in the vicinity of the bends through the use of a cutting production process forming chips including simultaneously cutting a plurality of adjacent extrema of the metal foil by using grinding tools.

13 Claims, 4 Drawing Sheets

METHOD FOR GENERATING OPENINGS IN A METAL FOIL

CROSS-REFERENCE TO RELATED APPLICATION

This is a continuation, under 35 U.S.C. §120, of copending International Application No. PCT/EP2007/006224, filed Jul. 13, 2007, which designated the United States; this application also claims the priority, under 35 U.S.C. §119, of German Patent Application No. DE 10 2006 032 861.2, filed Jul. 14, 2006; the prior applications are herewith incorporated by reference in their entirety.

BACKGROUND OF THE INVENTION

Field of the Invention

The present invention relates to a method for generating openings in a metal foil. Such metal foils are used, in particular, for the construction of exhaust-gas aftertreatment units which serve, for example, for the reduction of pollutants of mobile internal combustion engines in motor vehicles. The invention also relates to a method for producing a honeycomb body, an exhaust gas treatment unit having a honeycomb body and being produced by the method, as well as a motor vehicle.

In the production of such metal foils, it is known for the metal foils to be disposed in the manner of a honeycomb body, forming a multiplicity of channels or ducts which can be traversed by an exhaust gas. In that case, the metal foil serves as a delimitation of the channels. For that purpose, it is possible to use smooth and/or structured metal foils, with a certain configuration of the channels being formed due to the structure or the configuration of the metal foils.

Furthermore, it is also known for metal foils of that type to be provided with openings, for example in order to ensure an exchange of exhaust-gas flows into adjacent flow channels and/or in order to locate further components in the honeycomb body (for example measuring sensors, electrical connections, flow-guiding plates and the like).

The production of such openings in corrugated metal foils is currently often carried out by virtue of the metal foils firstly being slotted in a punching process, with corresponding corrugated rollers subsequently performing the structuring or shaping of the metal foil. The punching process has become widely established with regard specifically to automated series production of metal foils of that type for exhaust-gas aftertreatment units.

More recent developments in the configuration of exhaust-gas aftertreatment units of that type demand that the position of the openings with respect to the structure of the metal foil be defined in a particularly precise fashion. In particular, regulated processes are carried out for that purpose in order to ensure precise positioning of an opening of that type, for example on a wave peak or in a wave trough. Constantly recurring deformations of the metal foil, material inhomogeneities and the like permit the process to be carried out in a stable fashion only with a high level of technical expenditure.

SUMMARY OF THE INVENTION

It is accordingly an object of the invention to provide a method for generating openings in a metal foil, a method for producing a honeycomb body, an exhaust gas treatment unit having a honeycomb body produced by the method and a motor vehicle, which overcome the hereinafore-mentioned disadvantages of and at least partially solve the technical problems highlighted with regard to, the heretofore-known methods and products of this general type. In particular, it is intended to specify a method for generating openings which can be carried out quickly and cost-effectively with a high degree of precision, in such a way that the method is particularly suitable for use in series production. Furthermore, it is also intended to specify a method for producing a honeycomb body which likewise at least partially satisfies the above demands. Furthermore, it is also intended to specify products which can be produced in a particularly efficient manner.

With the foregoing and other objects in view there is provided, in accordance with the invention, a method for generating openings in a metal foil. The method comprises at least the following steps:

a) providing a planar metal foil;
b) generating at least one bend or curve in the metal foil; and
c) generating at least one opening in the vicinity or region of the at least one bend or curve by a cutting production process.

With regard to step a), it should be noted that a "planar" metal foil means a substantially "non-structured" metal foil. Accordingly, the metal foil, which is often wound on a so-called coil, normally need merely be unwound and supplied to the machining station. In this case, "non-structured" refers rather to a macroscopic view, in such a way that the cross section of the metal foil is substantially a line which is not (yet) (in particular periodically) curved.

With regard to step b), it should be noted that, during that method step, it is fundamentally also possible for a plurality of bends or curves to be formed simultaneously or one after the other in quick succession. In this case, it is also possible for the bend or curve to be a temporary deformation which is realized, for example, only for the time period of step c). However, an embodiment is preferable in which the at least one bend or curve is formed permanently into the metal foil by shaping, in such a way that the metal foil now has a structure.

Step c) now makes it clear that a departure has been made from the classic punching process. In this case, the openings are now formed through the use of a cutting production process. A "cutting" production process is to be understood to mean a production process in which the generation of the at least one opening is associated, in particular (virtually) exclusively, with the formation of chips. Examples of cutting production processes are, in particular, milling, drilling, grinding and the like.

In this case, through the use of the bend or curve, it is possible for a corresponding tool to be placed locally in engagement with the metal foil in order to carry out the cutting production process without making contact with large-area regions of the metal foil. In this case, the provision of the bend or curve itself permits highly precise localization of the machining to be carried out. When using cutting production processes, it is possible to obtain high throughput rates, in such a way that the processes may be used in a particularly cost-effective manner within the context of series production.

In accordance with another mode of the invention, it is particularly preferable for step c) to include an abrasive removal through the use of one of the following tools with an undefined cutting edge:

a grinding disk or a grinding wire.

In such tools with an undefined cutting edge, the material removal takes place in such a way that (more or less) randomly shaped grains of hard materials are placed in engagement with the metal foil, through the use of which a cutting machining process takes place. These production processes with a geometrically indeterminate cutting edge are often fine-machining processes, through the use of which it is possible to obtain very high levels of surface quality and dimensional accuracy. A "grinding disk" is often a disk-shaped tool which is rotated. At least partially corresponding grinding grains are attached to the surface of the grinding disk. The grinding grains carry out the cutting machining process. Another tool which is preferred in this case for carrying out a process of this type is a so-called "grinding wire." The grinding wire includes a substantially wire-shaped basic body, to the surface of which once again (more or less) randomly shaped grains of hard materials are attached. Through the use of a (in particular translatory) relative movement between the grinding wire and metal foil, in the event of contact of the grinding wire with the metal foil, a cutting machining process is carried out, through the use of which openings can be formed in a precise fashion in the region or vicinity of the at least one bend or curve of the metal foil.

In accordance with a further mode of the invention, the metal foil performs a feed movement during step c). This means, in particular, that the metal foil performs the steps a) to c) continuously, and in particular with a uniform feed motion, in such a way that a continuous process is provided. The tools for carrying out the cutting production process may also, in particular intermittently, be moved relative to the metal foil.

In accordance with an added mode of the invention, step b) includes the generation of a permanent structure with a multiplicity of bend or curves. This means, in particular, corrugated or similar structures, with the profile of the extrema of the structure preferably being aligned substantially perpendicularly or obliquely with respect to the feed movement. A permanent structure may thus be produced for example through the use of a rolling deformation process with profiled rolling wheels. "Permanent" means, in particular, that the shaping of the structure not only takes place in the elastic range of the metal foil. In this case, the structure offers, in the extrema, a multiplicity of bends or curves which are suitable for engaging with a tool for carrying out a cutting production process.

In accordance with an additional mode of the invention, it is also considered to be advantageous that the device for generating the at least one bend or curve also serves as a guide for the metal foil during step c). This means, in particular, that the metal foil is first provided with a structure in a tool, and during the engagement of the tool for carrying out the cutting production process, the tool penetrates into the structured metal foil at one side and the tool for shaping the structure stabilizes the metal foil on the opposite side.

In accordance with yet another mode of the invention, it is also proposed that a step d) be carried out in which at least one edge of the at least one opening is smoothed. "Edge" means, in particular, the boundary region of an opening. Smoothing of the edge, for example in order to remove burrs which are located there, may be realized by brushing, washing or similar processes.

With the objects of the invention in view, there is also provided a method for producing a honeycomb body including at least one corrugated metal foil and a flat metal strip. The method comprises at least the following steps:

A) producing at least one corrugated metal foil with openings according to the invention;
B) forming at least one stack from the at least one corrugated metal foil and at least one flat metal strip;
C) winding the at least one stack;
D) inserting the at least one stack into a housing; and
E) joining at least the metal foil and the metal strip to one another or joining at least the metal foil or the metal strip to the housing.

In this case, the honeycomb body often has a multiplicity of channels which are disposed adjacent one another, which run parallel to one another and which can be traversed by a fluid. For this purpose, a corrugated metal foil and a flat metal strip (or a plurality of such metal foils or metal strips) are advantageously disposed alternately to one another so as to form in each case a part of a channel wall. The alternately disposed metal foils or metal strips may be aligned with one another and disposed so as to form a stack. At least two or three such stacks are preferably then wound or bent with one another and subsequently inserted into a housing in such a way that advantageously all of the ends of the metal foils or metal strips come to bear against the inner side of the housing. In order to ensure that the components no longer change their relative position with respect to one another, it is also proposed that at least the metal foils and the metal strips be fixed relative to one another, with the metal foils and/or the metal strips advantageously also being connected to the housing. With regard to the joining process, brazing or a similar process (for example generating diffusion connections, welding . . . ) is proposed in particular.

In accordance with another mode of the invention, with regard to step B), it is also considered to be advantageous that, before step B), at least one local projection is generated in the at least one flat metal strip. The projection interacts, at least during step B), with at least one opening of the at least one corrugated metal foil. That is to say, in other words, in particular that the at least one opening in the corrugated metal foil can serve to provide fixing during the formation of the stack, and therefore to provide a non-interchangeable configuration of the corrugated metal foil with the flat metal strip, and/or during step C) to prevent an undesired relative movement of the metal foil or of the metal strip with respect to the stack. The local projection and the opening thereby provide a type of form-locking which determines the relative position of the metal strips and of the metal foils with respect to one another. A form-locking connection is one which connects two elements together due to the shape of the elements themselves, as opposed to a force-locking connection, which locks the elements together by force external to the elements.

With the objects of the invention in view, there is furthermore provided an exhaust-gas aftertreatment unit, comprising at least one metal foil produced according to the invention, and at least one nonwoven composed of wire filaments. The at least one metal foil and the at least one nonwoven together form a honeycomb body with channels. At least some of the channels are at least partially closed off.

An exhaust-gas aftertreatment unit of this type is used, in particular, as a so-called filter for an exhaust system of a motor vehicle. For this purpose, a multiplicity of corrugated metal foils of this type are advantageously coated alternately with substantially flat nonwovens and joined together in the manner of a honeycomb body. The channels may now be (partially) closed off at one or more points in the region of the channel ends and/or in between. Flow constrictions are thereby formed which cause a partial deflection of the exhaust-gas flow through the nonwoven, in such a way that particles which are entrained in the exhaust-gas flow can be collected in the wire filaments or in the nonwoven. The particles which are accumulated in this way may subsequently be converted (for example also in a catalytically assisted manner).

With the objects of the invention in view, there is additionally provided an exhaust-gas aftertreatment unit, comprising at least one honeycomb body produced according to the invention. At least the metal foil or the metal strip is provided at least partially with a coating selected from the group consisting of:

a coating for an oxidation of components of an exhaust gas,
a coating for a reduction of components of an exhaust gas, or
a coating for storing components of an exhaust gas.

If appropriate, it may also be advantageous to provide combinations of the coatings, with zones of different catalytic activity which are delimited from one another preferably being provided.

With the objects of the invention in view, there is also provided an exhaust-gas aftertreatment unit, comprising at least one honeycomb body produced according to the invention. The at least one honeycomb body includes channels having a channel cross section. The channels at least partially have flow deflections closing off at least a part of the channel cross section.

In this case, the flow deflections are, for example, formed in the direct vicinity of the openings of a corrugated metal foil. In this case, the flow deflections at least partially close off the cross section of the channels, in such a way that, in turn, a deflection of partial exhaust-gas flows into adjacent channels is provided.

With the objects of the invention in view, there is concomitantly provided a motor vehicle, comprising at least one exhaust-gas aftertreatment unit according to the invention.

The use of at least one exhaust-gas aftertreatment unit, as described above in different structural variants, in a motor vehicle, is particularly advantageous.

Other features which are considered as characteristic for the invention are set forth in the appended claims, noting that the features listed individually in the claims may be combined with one another in any desired technologically meaningful way and highlight further refinements of the invention and that the description, which explains and specifies the individual features from of the claims, also discloses further advantageous embodiments of the invention.

Although the invention is illustrated and described herein as embodied in a method for generating openings in a metal foil, a method for producing a honeycomb body, an exhaust gas treatment unit having a honeycomb body produced by the method and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, with which the invention and the technical field are explained in more detail. In this case, the figures show particularly preferred embodiment variants of the invention, to which the invention is, however, not restricted.

DETAILED DESCRIPTION OF THE INVENTION

Figure 1:
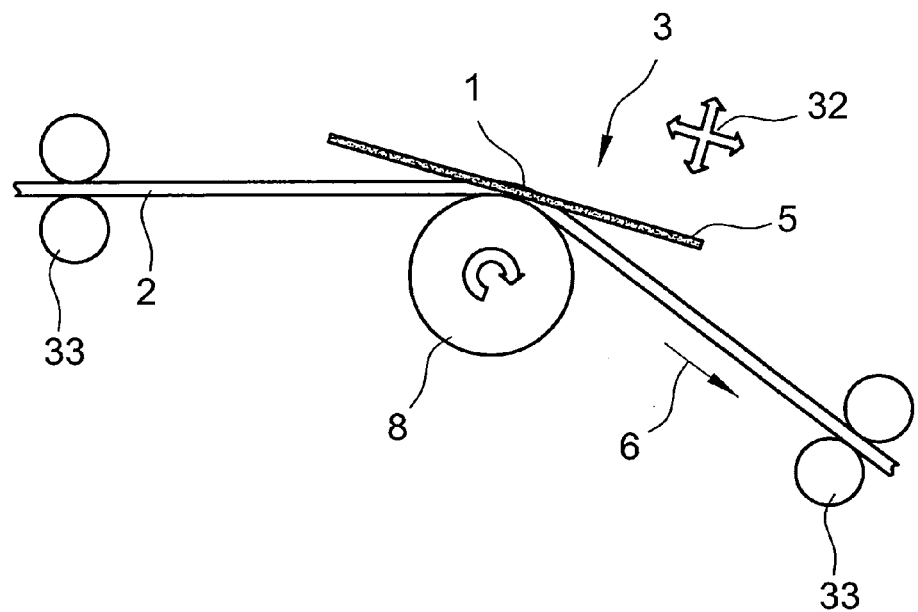
FIG. 1 is a diagrammatic, longitudinal-sectional view illustrating a first method for generating openings in a metal foil.

Referring now to the figures of the drawings in detail and first, particularly, to FIG. 1 thereof, there is seen, in principle, a method for generating openings 1 in a metal foil 2. For this purpose, the metal foil 2 is driven through the use of rollers in such a way that the metal foil 2 performs a feed movement 6. A guide 8, which is also provided in this case, forms a bend or curve 3 into the metal foil 2. A grinding wire 5 is placed in cutting contact with the metal foil 2 in the region of the bend or curve 3, in such a way that the opening 1 is formed. In order to produce openings 1 of this type, it is possible for the grinding wire 5 to move in different movement directions 32 in order to produce a corresponding opening 1 at suitable locations.

Figure 2:
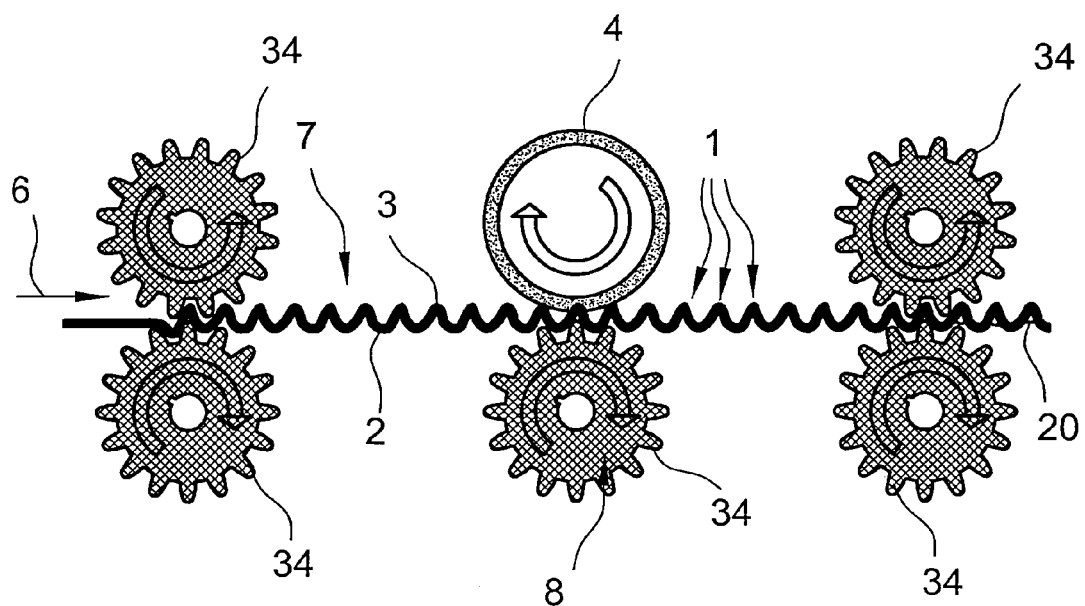
FIG. 2 is a longitudinal-sectional view illustrating a method variant for generating openings in a corrugated metal foil through the use of a grinding disk.

FIG. 2 shows the formation of openings 1 of this type in a metal foil 2 which is formed with a permanent structure 7. For this purpose, the metal foil 2 is firstly guided in the direction of its feed movement 6 through two profile wheels 34 which mesh with one another, in such a way as to form the structure 7 that includes a multiplicity of curves 3 disposed at both sides. This is followed by a machining station for a cutting production process. In this case, the machining station firstly includes a guide 8 which is likewise formed as a profile wheel 34 and is disposed opposite a grinding disk 4. The grinding disk or wheel 4 protrudes into the metal foil 2 through corresponding slots, for example, in the peripheral surface of the profile wheel 34, in such a way that openings 1 are subsequently formed, in this case only on the upper side of the metal foil 2. The metal foil 2, which is provided with holes in this way, may be subjected to a further shaping machining step, with the metal foil 2 being supplied to another pair of profile wheels 34 which form flow deflections 20 in the region of the openings 1.

Figure 3:
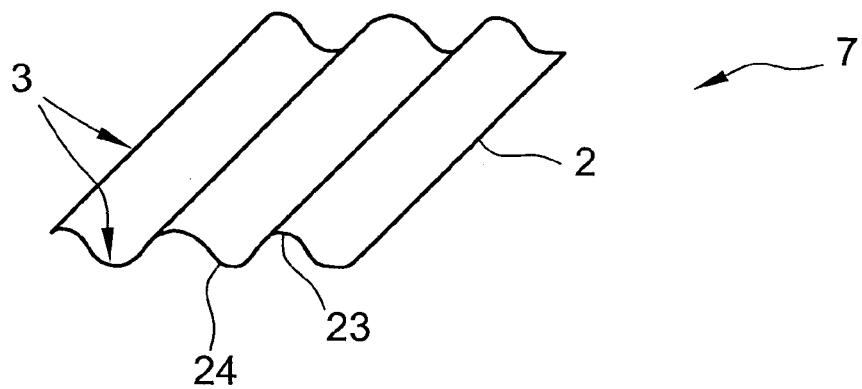
FIG. 3 is a perspective view of an embodiment variant of a metal foil after carrying out a step b) of the method according to the invention.

FIG. 3 shows, in a perspective illustration, a corrugated metal foil 2 with a permanent structure 7, which has a multiplicity of curves 3. In this case, the curves 3 are formed alternately in the region of elevations 23 and depressions 24, and may be provided in each case with an opening 1.

Figure 4:
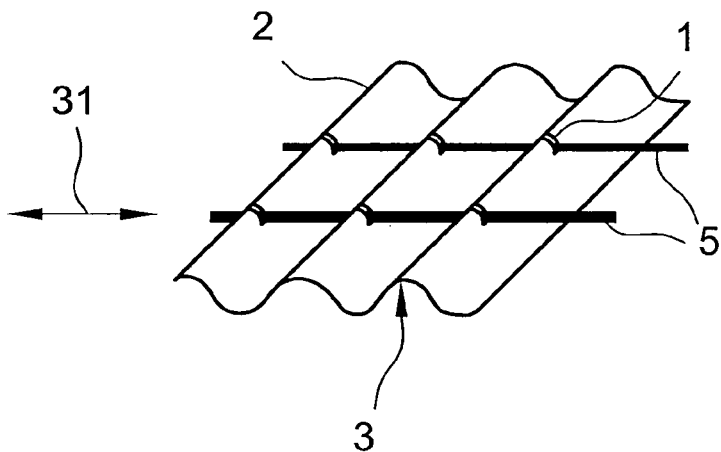
FIG. 4 is a perspective view illustrating a generation of a plurality of openings in a corrugated metal foil.

FIG. 4 shows the simultaneous production of a multiplicity of openings 1 in a corrugated metal foil 2 of this type. For this purpose, the metal foil 1 is placed in contact with a multiplicity of tools, which are formed in this case in the manner of a grinding wire 5. The tools (operating simultaneously and offset with respect to one another) generate openings 1 in the region of the bend or curve 3 through the use of cutting. In this case, the grinding wire 5 performs a relative movement 31 with respect to the metal foil 2.

Figure 5:
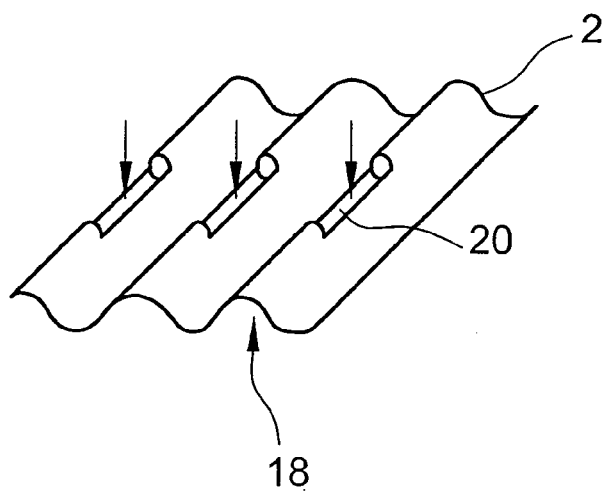
FIG. 5 is a perspective view illustrating a generation of flow deflections in a corrugated metal foil.

As is seen in FIG. 5, in a subsequent machining step, a metal foil 2 which has been pre-treated, for example according to FIG. 4, may now additionally be provided with flow deflections 20 by virtue of pressing in the regions of the metal foil 2 which are situated between the openings 1 that have just been generated. The flow deflections 20 of the metal foil 2 thereby project into channels 18, which are later formed by them, and create a flow constriction.

Figure 6:
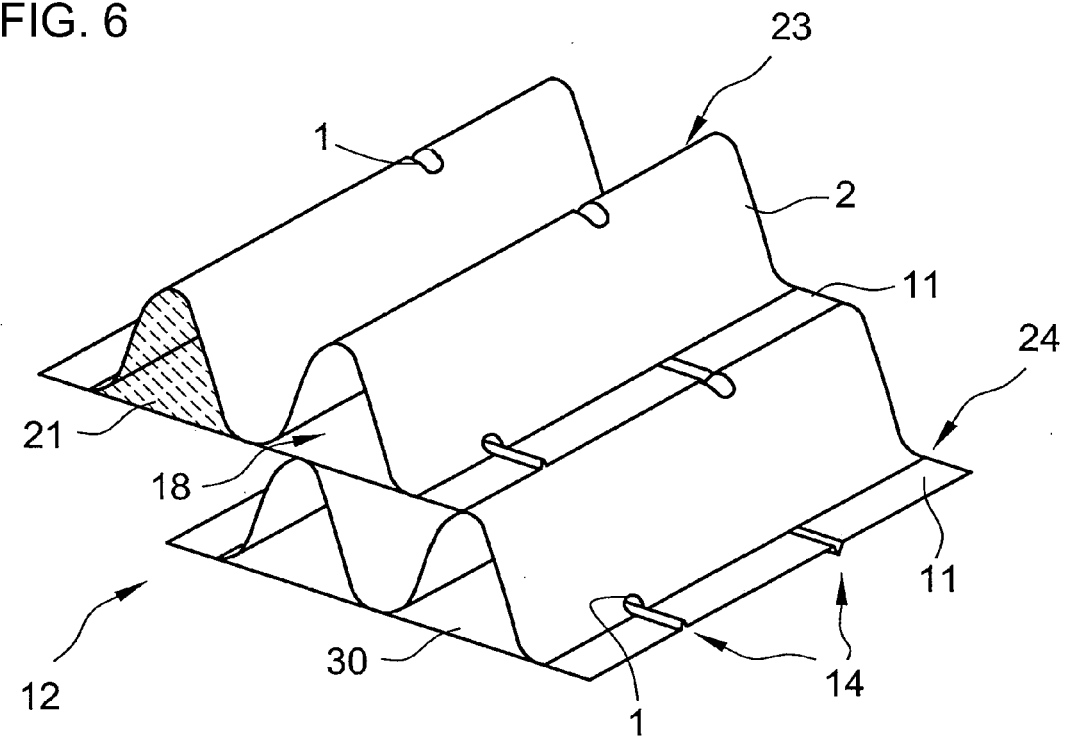
FIG. 6 is an enlarged perspective view of a stack of metal foils and metal strips which interact with one another in the region of the openings.

FIG. 6 shows a part of a stack 12 in which a flat metal strip 11 and a corrugated metal foil 2 are stacked in an alternating fashion. It can be seen that, due to the contact of the corrugated metal foil 2 with the flat metal strip 11, channels 18 are formed which extend substantially parallel to one another and which form a predefined channel cross section 21. In the embodiment variant shown in this case, openings 1 are formed in the region of the elevations 23 and the depressions 24 of the corrugated metal foil 2. The openings 1 serve to receive projections 14 which are formed in the flat metal strips 11. This produces a type of form-locking which prevents a movement of the metal foil 2 and metal strip 11, in such a way that the components cannot be moved relative to one another, in particular with respect to their end sides 30, and the structure is also maintained during winding or during insertion of the components into a housing.

Figure 7:
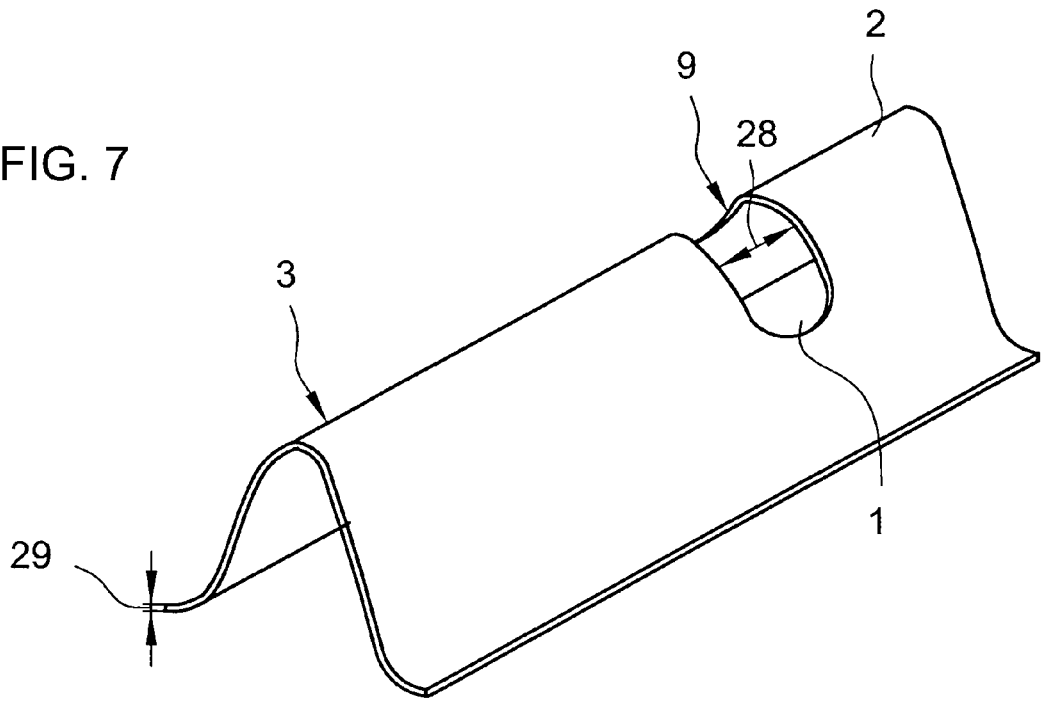
FIG. 7 is a fragmentary, perspective view of a corrugated metal foil with an opening.

FIG. 7 again shows, in a fragmentary view, a corrugated metal foil 2 with a predefined thickness 29 which lies, for example, in a range of from 0.02 to 0.08 mm. An opening 1 is illustrated in the region of the bend or curve 3. Specifically, during the production of such openings 1 with a grinding wire or a grinding disk, an opening 1 is rather formed which extends substantially transversely with respect to the profile of the bend or curve 3, for example in the manner of a slot. In this case, the opening 1 may be produced with a width 28, for example in a range of from less than 1 mm up to several millimeters, for example 10 millimeters. If it is necessary for openings 1 to be formed with a particularly high level of quality, edges 9 of the openings 1 could also be freed from burrs and the like retroactively.

Figure 8:
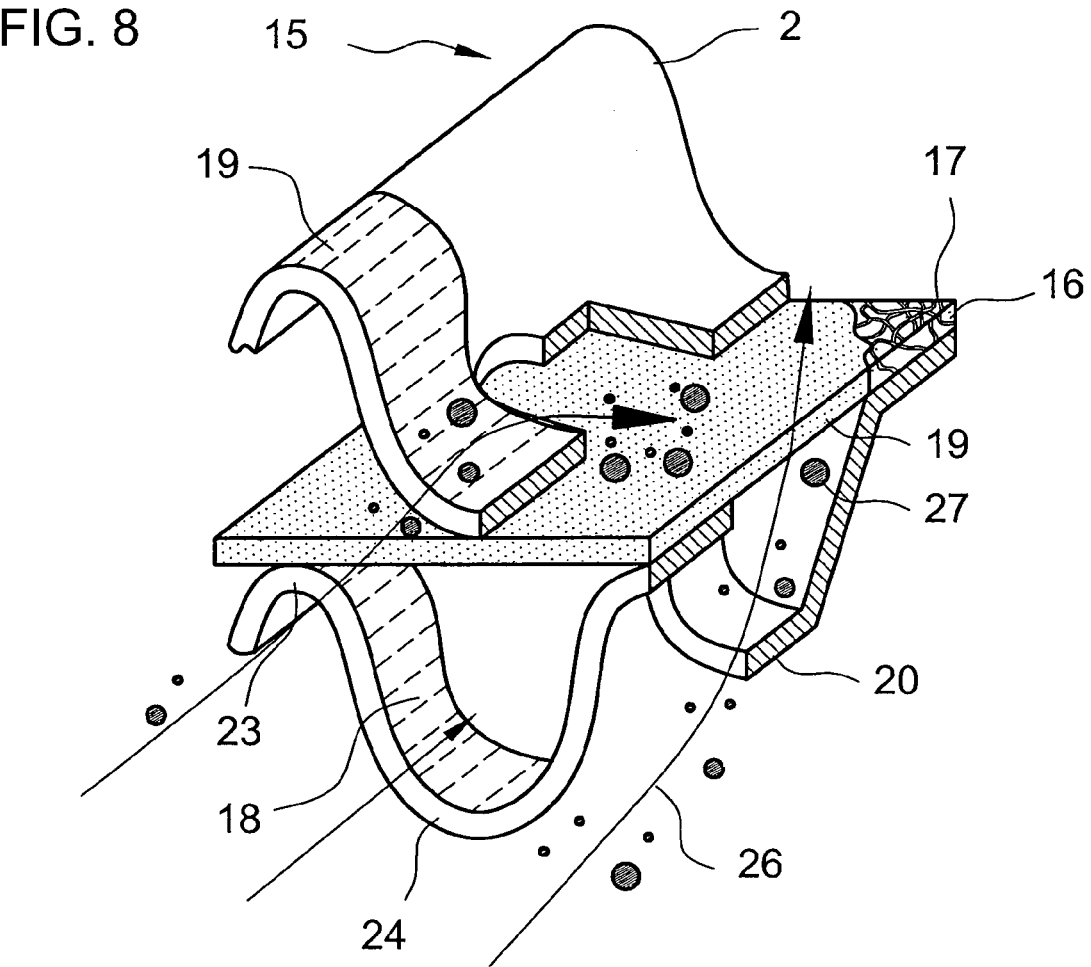
FIG. 8 is a fragmentary, perspective view of an exhaust-gas aftertreatment unit which is constructed as a so-called secondary-flow filter.

FIG. 8 shows a fragmentary view of a so-called secondary-flow filter, in which an exhaust gas is conducted through an exhaust-gas aftertreatment unit 15 in a flow direction 26. The exhaust-gas aftertreatment unit 15 is formed by an alternating configuration of a corrugated metal foil 2 and a nonwoven or fleece textile material 16 with wire filaments 17. The corrugated metal foil 2 in turn has elevations 23 and depressions 24 in such a way that, together with the nonwoven 16, channels 18 which can be traversed by a flow are formed. The exhaust gas flows, together with particles 27 which are contained therein, through the channels 18, with the flow deflections 20 which are formed with the metal foil 2 resulting in a deflection of the flow direction 26. This causes the particles 27 to be accumulated on the nonwoven 16. In addition, coatings 19 may be provided on the metal foil 2 and/or on the nonwoven 16. The coatings 19 permit the conversion of the particles.

Figure 9:
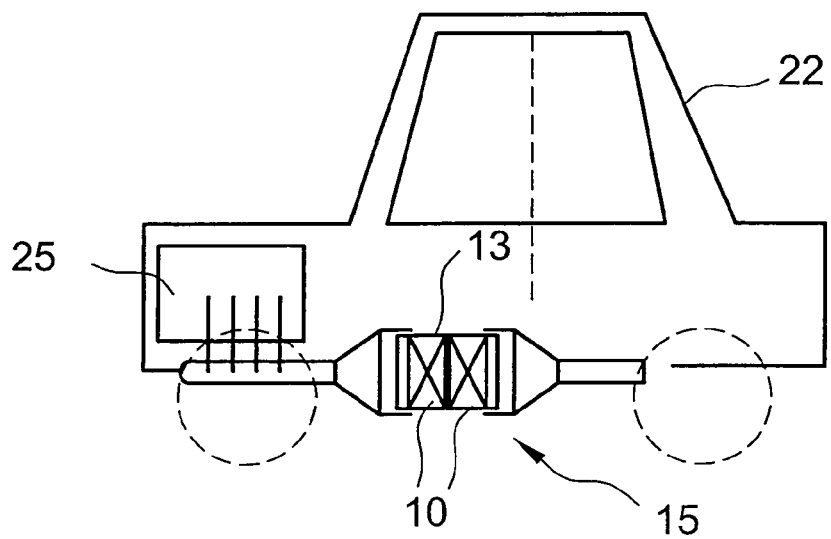
FIG. 9 is a longitudinal-sectional view of a motor vehicle with an exhaust system.

FIG. 9 shows a motor vehicle 22 which has an internal combustion engine 25. The exhaust gas proceeds from the internal combustion engine 25, in which the exhaust gas is produced, through various exhaust-gas aftertreatment units 15, having a housing 13 with two honeycomb bodies 10, which are shown in this case by way of example.

The invention claimed is:

1. A method for generating openings in a metal foil, the method comprising the following steps:
   a) providing a planar metal foil;
   b) generating bends defining extrema in the metal foil; and
   c) generating at least one opening in vicinity of the bends by a cutting production process forming chips including an abrasive removal by a grinding disk having an undefined cutting edge simultaneously cutting a plurality of adjacent extrema of the metal foil.

2. A method for producing a honeycomb body including at least one corrugated metal foil and a flat metal strip, the method comprising the following steps:
   A) producing at least one corrugated metal foil with openings according to claim 1;
   B) forming at least one stack from the at least one corrugated metal foil and at least one flat metal strip;
   C) winding the at least one stack;
   D) inserting the at least one stack into a housing; and
   E) joining at least the metal foil and the metal strip to one another or joining at least the metal foil or the metal strip to the housing.

3. The method according to claim 2, which further comprises, before step B), generating at least one local projection in the at least one flat metal strip, the at least one local projection interacting, at least during step B), with at least one opening of the at least one corrugated metal foil.

4. The method according to claim 1, wherein the metal foil performs a feed movement during step c).

5. The method according to claim 1, wherein step b) includes generating a permanent structure with a multiplicity of bends or curves suitable for engaging with a tool for carrying out a cutting production process.

6. The method according to claim 1, which further comprises carrying out the step of generating at least one bend with a device also serving as a guide for the metal foil during step c).

7. The method according to claim 1, which further comprises:
   d) smoothing at least one edge of the at least one opening.

8. The method according to claim 1, which further comprises carrying out step c) by generating the at least one opening as slots.

9. The method according to claim 1, which further comprises covering the at least one opening with a metal strip in a stack formation.

10. The method according to claim 1, which further comprises carrying out step c) by generating the at least one opening only on extrema and not on flat areas of the metal foil having the at least one bend.

11. The method according to claim 1, which further comprises carrying out step c) by generating the at least one opening in a continuous process during which the metal foil is transported.

12. The method according to claim 1, which further comprises carrying out step a), then step b), then step c).

13. A method for generating openings in a metal foil, the method comprising the following steps:
   a) providing a planar metal foil;
   b) generating bends defining extrema in the metal foil; and
   c) generating at least one opening in vicinity of the bends by a cutting production process forming chips including an abrasive removal by a grinding wire having an undefined cutting edge simultaneously cutting a plurality of adjacent extrema of the metal foil.

* * * * *